United States Patent
Mangum

[11] Patent Number: 4,663,806
[45] Date of Patent: May 12, 1987

[54] FISH HANDLE

[76] Inventor: Owen A. Mangum, 2550 9th St., Douglas, Ariz. 85607

[21] Appl. No.: 853,877

[22] Filed: Apr. 21, 1986

[51] Int. Cl.⁴ ............................................. A22C 25/06
[52] U.S. Cl. ..................................................... 17/70
[58] Field of Search .................. 17/44, 44.3, 44.2, 70, 17/21

[56]  References Cited

U.S. PATENT DOCUMENTS

| | | |
|---|---|---|
| 481,104 | 8/1892 | Clow . |
| 710,734 | 10/1902 | Armstrong ........................ 17/70 X |
| 1,920,954 | 8/1933 | Benedict . |
| 2,312,160 | 2/1943 | Haislip . |
| 2,607,070 | 8/1952 | Wertz et al. . |
| 2,801,877 | 8/1957 | Hetrick . |
| 3,093,859 | 6/1963 | Cooper . |
| 3,177,523 | 4/1965 | Andersen . |
| 3,414,935 | 12/1968 | Senna . |
| 3,715,229 | 2/1973 | Carnahan . |
| 3,757,386 | 9/1973 | Murray . |
| 4,023,303 | 5/1977 | Maunu . |
| 4,196,538 | 4/1980 | Crone . |

OTHER PUBLICATIONS

Advertisement-Clean A Fish Tool-IPCO.

Primary Examiner—Willie G. Abercrombie
Attorney, Agent, or Firm—Hall, Myers & Rose

[57]  ABSTRACT

A fish clamp for cleaning and scaling operations having a handle, opposing jaws and a spring means for tensioning the jaws closed, where each jaw has rows of intermeshing teeth, one along the front edge and two disposed in a V-shaped pattern therebehind, where each tooth defines the trace of a cycloid.

13 Claims, 7 Drawing Figures

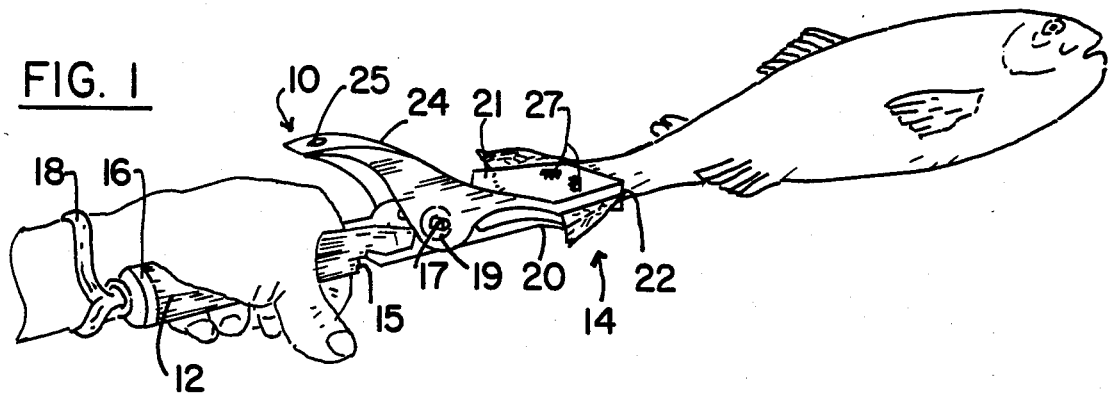
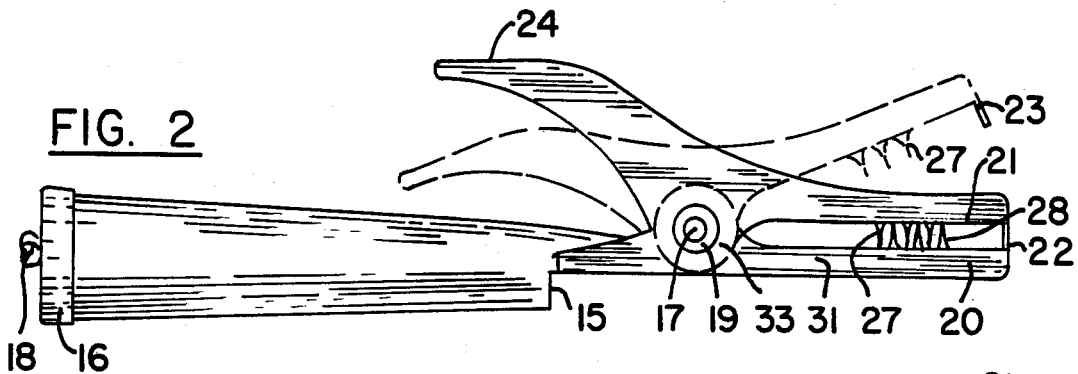
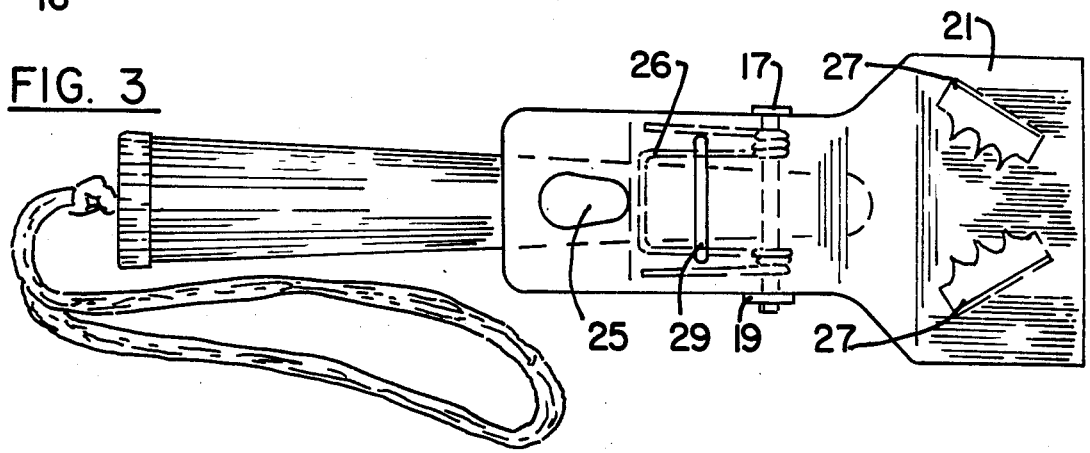
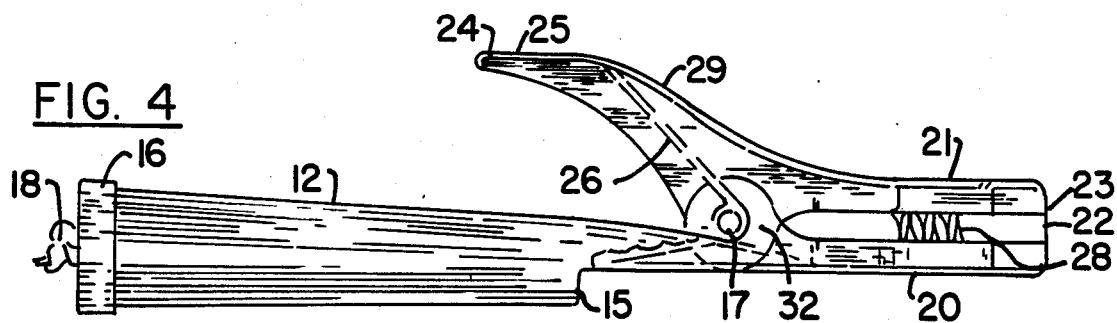

FISH HANDLE

TECHNICAL FIELD

This invention relates to a fish scaling and cleaning tool and, more particularly, to a portable clamping tool incorporating jaws having cycloid shaped teeth along the front edge of the jaws and in rows disposed behind the front edge where the rows define a V-shaped pattern.

BACKGROUND OF THE INVENTION

There is a large number of commercially available fish cleaning and fish filleting devices. There is an even greater number of such devices disclosed in patent literature. Most tools employed for fish scaling and cleaning are old, of simple construction and fairly easy to use. Many of the devices are characterized by toothed jaws. Often during scaling or cleaning operations, the fish will slip or move relative to the tool which results in tearing of the flesh. What has not been disclosed in the prior art is a clamping device easily employed in the field and which is capable of securing a fish in at least two dimensions during cleaning and scaling operations while minimizing damage to the fish body.

SUMMARY OF THE INVENTION

It is an object of this invention to overcome the problems associated with prior art devices.

It is another object of this invention to provide a simple, ready to use, scaling and cleaning tool for fish.

It is another object of this invention to provide a safe, portable device for clamping the fish thereby positionally stabilizing the fish during cleaning and scaling operations.

These and other objects are satisfied by a device which secures fish, including a handle and a first and a second opposed coacting members connected to said handle, where the members are pivotally mounted relative to each other and capable of movement between a first closed position and a second open position. The device also features a means for tensioning the members in the first closed position. The members each incorporate a first row of teeth disposed along the front edge thereof and a second and a third rows of teeth in a V-shape configuration disposed behind and diverging from the first row. The said first, second and third rows of teeth of the first member correspond to and cooperate with the first, second and third rows of teeth of the second member in a manner to prevent movement of a clamped fish in at least two dimensions.

Other objects of the invention are satisfied by a tool including a first elongated member including an elongated handle and a forward section including a front edge having first, second and third rows of orthogonally projecting teeth said first row being located proximate to the front edge and said second and third rows diverge oppositely relative to the front row and the elongated bisector of the elongated member, a second member having a depressible thumb grip and a forward section having orthogonally projecting teeth where the forward section of said second member overlies that of said first member, and means for pivotally mounting said first and second members and tensioning said members where the border of each tooth forms a triangle, the sides of which are on inwardly curved radius arc and the base of which is the respective members, when said first and second forward sections are tensioned together, the points of each tooth project into the space between corresponding teeth on the opposite section.

The invention, by other definition, provides an improved securing tool having a handle, spring bias closed, pivotally mounted coacting opposed jaws. Each jaw has three rows of teeth, one along the front edge and two rows in a V-configuration diverging from the front row. Concerning the teeth themselves, each defines the trace of a cycloid; a shape which provides a sharp point to puncture the fish tissue with a minimum of damage. The teeth on the lower jaw intermesh and coact with the teeth on the upper jaw. The geometric configuration of the individual teeth and the sets of teeth allow for a fish to be secured in at least two dimensions, i.e. in the plane defined by the rows of teeth.

The invention, accordingly, provides anglers with a convenient tool composed of a minimum of parts which fits easily in a tackle box, is of simple design and involves a minimum of effort to assemble and disassemble. Also, the tool is convertible, i.e. it can easily be combined with a filleting board.

BRIEF DESCRIPTION OF THE DRAWINGS

FIG. 1 is a perspective view of the invention.

FIG. 2 is a side view of the invention.

FIG. 3 is a top view of the invention.

FIG. 4 is a cross-sectional view along the vertical longitudinal axis.

DETAILED DESCRIPTION OF THE ILLUSTRATED EMBODIMENTS

Figure 5:
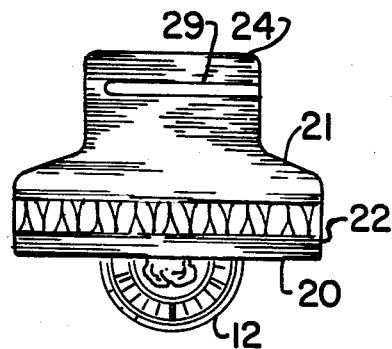
FIG. 5 is a front view of the invention.

Fishing clamp tool 10 is illustrated in FIG. 1 as it would be employed in a cleaning or descaling operation. Tool 10 includes handle 12 and pivotally connected, opposing jaw assembly 14. Handle 12 is tapered toward jaw assembly 14. Attached to its end is end cap 16 which secures nylon safety wrist cord 18. Advantageously, the rearward portions of handle 12 may be covered with a flexible thermosetting coating to provide a non-slip and softer handling surface.

Flat pan-like lower jaw 20 extends forwardly of handle 12. Notch 15 is formed at the intersection between rounded handle 12 and jaw 20 where the bottom of jaw 20 projects obliquely therefrom. Lower jaw 20 is essentially flat and has short perimeter edges turned up at a 90° angle where front edge 22 is higher than side walls 31. Preferably, handle 12 and lower jaw 20 are die-stamped and shaped from a single piece of appropriate corrosion resistant sheet metal such as zinc chromate or cadmium plated steel. Specific stamping and shaping procedures will be dictated by the physical characteristics of the material employed. The selection of such techniques and materials are well within conventional and mechanical knowledge of the skilled artisan.

Returning to the tool structure, formed along forward edge 22 of lower jaw 20 are a plurality of upwardly projecting teeth (see also FIG. 5). Each tooth is in the shape of a cycloid. In other words, a trace defined by a point on a circle when rotated about or along a line. An alternative description would be a trace of an arc radius, inwardly curved, isosceles triangle. The principal purpose of this shape is to provide a sharp point and space between coacting opposed teeth. This geometry permits clean puncturing of the fish tissues including tail and cartilage, as described below.

Disposed behind edge 22 and stamped from the flat portion of jaw 20 are two identical rows of teeth 28. Rows 28 diverge from the elongated bisector defined by handle 12 and jaw 20, forming the left and right sides of a V. The teeth comprising rows 28 are substantially identical to the teeth of front edge 22 and, preferably, each row 28 includes four such teeth. Rearwardly disposed of rows 28 and integrally formed with side walls 31 are hinge pin hole extensions 32. Accordingly, lower jaw 20 provides a distinct pattern of rows of teeth and means for pivotal attachment to upper jaw 21.

Upper jaw 21, is similarly die stamped and shaped to correspond to and cooperate with lower jaw 20. Upper jaw 21, like lower jaw 20, features three rows of teeth and side-wall extensions 33. The three rows of teeth overlie and extend into the spaces between the teeth on lower jaw 20. Extensions 33, separated by a slightly greater distance than extensions 32, are designed to fit over or outside extensions 32 in a fashion where their central holes are alignable. Once aligned, upper jaw 21 is pivotally mounted to lower jaw 20 by inserting hinge pin 17 through the holes in extensions 32 and 33. Hinge pin 17 also serves to secure tension spring 26, as described in greater detail below. Speed-nut 19 which is easily popped on and off of the end of hinge pin 17, is provided to minimize effort required to disassemble, clean and assemble tool 10.

As noted, jaw 21 features a forward row of teeth and two rearwardly disposed, diverging rows of teeth which intermesh with the rows of lower jaw 20. Examining FIG. 3, the die stamping of diverging rows of teeth 27 out of the flat portion of jaw 21 is evident. Rows 28 are die stamped in a like manner from lower jaw 20. The negative outline of the cycloid-shaped teeth, which in this figure, project into the plane of the paper, is clearly defined. FIGS. 2, 4 and 5, depict the relationship of upper rows 23 and 27 intermeshing and juxtaposing with lower rows 22 and 28, respectively. The points are relatively sharp and the teeth are inwardly curved to facilitate penetration of fleshy or bony material pinioned therebetween. The elipitcal-shaped space between each of the teeth allows complete penetration without unnecessarily compressing the fish flesh. Hence, the fish is substantially secured with a minimum of damage to the punctured tissue.

Turning back to the structure of tool 10, rising rearwardly from the flat, forward portion of jaw 21 is thumb grip 24. Thumb grip 24 lies above handle 12 and houses one end of two segments of steel torsion spring 26. Wire spring 26 includes an upper segment and lower segment both extending from a double spiral mandrel adapted to receive hinge pin 17. Thus, spring 26 is held in position by pin 17 which in turn is secured by extensions 32 and 33. The lower segment of spring 26 is contained between the sides of lower jaw 20 behind extensions 32 and applies tension to the upper surface of jaw 20. Similarly, the upper segment applies oppositely-directed spring tension to the lower surface of thumb grip 24 (see FIG. 4). Accordingly, jaw assembly 14 is biased in the closed, or clamped, position. Although spring 26 urges jaws 20 and 21 together, the jaws can be separated by depressing thumb grip 24. The upper surface of thumb grip 24 is coated with a thermosetting plastic similar to that used to coat handle 12. Ridge 29 is provided in the upper surface of thumb grip 24 where the thermoplastic will flow into and set therein to secure the thermosetting material Ridge 29 extends transversely to the direction of elongation and therefore, the principal lines of force. Consequently, the coating is stabilized on thumb grip 24.

A feature also incorporated in thumb grip 24, specifically designed to positionally stabilize the user's thumb during depression and opening of jaw assembly 14, is tear-shaped hole 25. It is positioned between the end of grip 24 and ridge 29.

Figure 6:
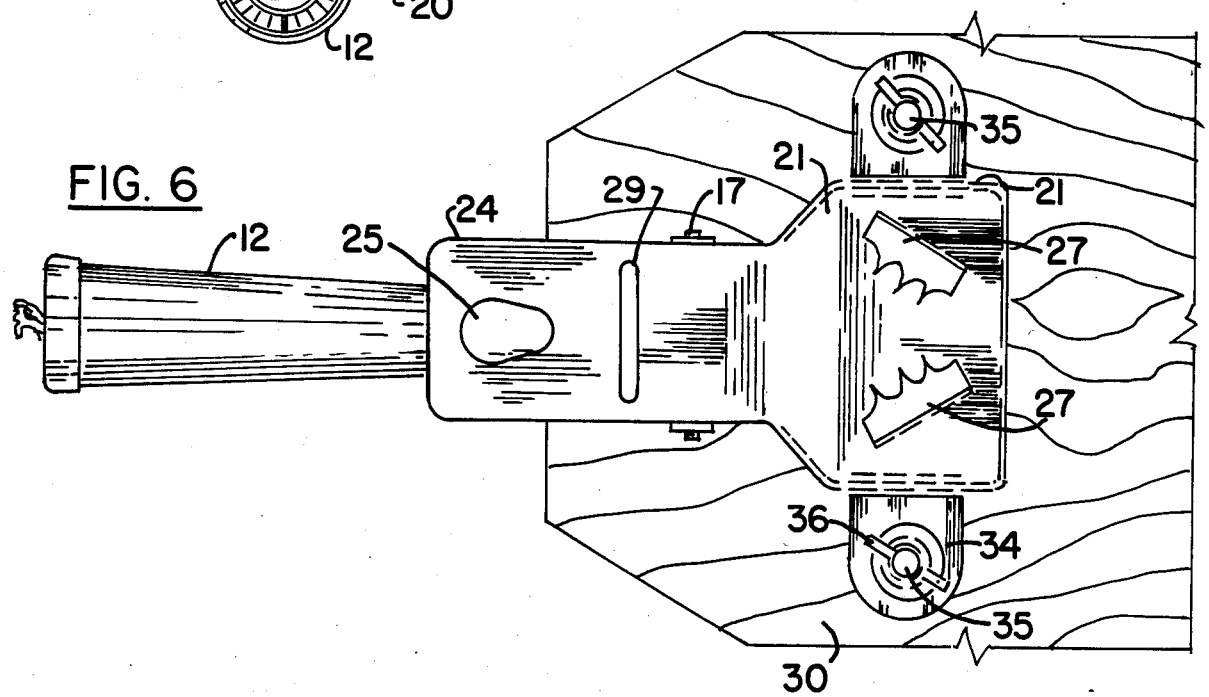
FIG. 6 is a top view of an alternative embodiment of the invention.
Figure 7:
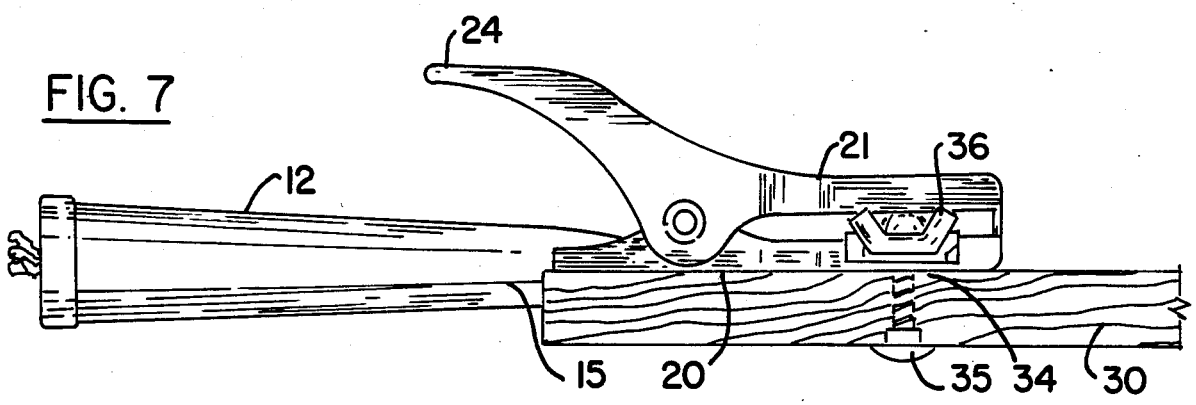
FIG. 7 is a side view of the alternative embodiment illustrated in FIG. 6.

Turning now to the alternative arrangement of the invention depicted in FIGS. 6 and 7, tool 10 is readily convertible to a filleting board clamp. This conversion may be desirable when large fish are involved. Board 30 is of conventional construction (even being made by the user) and has two holes to secure bolt 35. The holes and, therefore, bolts are spaced apart a distance greater than the width of jaw assembly 14 plus the distance required by hook clips 34. The holes are positioned forward of the rearward edge of the board by a distance approximately equal to that between notch 15 and rows 28. Hook clips 34 seat over the turned up side walls of lower jaw 20 and preferably are located in line with rows 28. Each of clips 34 have a hole to accommodate bolt 35. Bolt 35 is insertable through the hole and a conventional washer and wing nut 36 can be tightened thereon which secure each of the clips 34 to lower jaw 20 and therefore board 30. Handle 12 projects rearwardly from notch 15 and the edge of board 30. Thus positional stability of tool 10 and full use thereof is achieved.

Briefly summarizing the operations of tool 10 by depressing thumb grip 24, jaws 20 and 21 are separated. The tail of a fish is positioned approximately on center between the jaws and the pressure is released on the thumb grip. Upon release of the pressure, spring 26 biases jaw assembly 14 closed, thereby clamping down on the fish tail. The teeth easily puncture the fish tissue. Rows 22 and 23 prevent the fish from moving in the direction of elongation of tool 10 while rows 27 and 28 prevent side-to-side motion. Accordingly the fish is secured in at least two dimensions.

Given the foregoing, the modifications and variations of the described embodiment should now be apparent to the skilled artisan. Accordingly, such modifications and variations are intended to fall within the spirit and scope of the invention as defined by the following claims.

I claim:
1. A tool for securing fish, comprising:
   (a) a handle;
   (b) a first and a second opposed coacting members connected to said handle, said members being pivotally mounted relative to each other and capable of movement between a first closed position and a second open position;
   (c) means for tensioning said members in said first closed position;
   (d) a first row of teeth disposed along the front edge of said members and a second and a third rows of teeth in a V-shape configuration disposed behind and diverging from said first row,
   where said first, second and third rows of teeth of said first member lie substantially in a plane and correspond to and cooperate with said first, second and third rows of teeth of said second member in a manner to prevent movement of a clamped fish in two dimensions.

2. A tool according to claim 1 where the handle is elongated and the second and third rows of teeth diverge oppositely from the elongated bisector formed along the handle and the members.

3. A tool according to claim 2 where the handle is tapered toward the members.

4. A tool according to claim 3 where the compression means is a spring and further including pin means for pivotally mounting said first and second members, said pin means being located rearwardly of said second and third rows of teeth where said spring is mounted to said pin means.

5. A tool according to claim 4 where the outline of each tooth comprising said rows of teeth defines the trace of a cycloid where said tooth possesses a point for puncturing.

6. A tool according to claim 5 where said second and third rows consist of three teeth and said handle and members are constructed from corrosion resistant material.

7. A tool according to claim 1 further comprising a filleting board and means for securing one of said coacting members to the filleting board.

8. A tool according to claim 7 where said filleting board has bolt holes, said second coacting member has upwardly projecting sides, and said means for securing said second member to the filleting board are hook clips adapted to be removable bolted through said holes in said filleting board to clamp over said sides of said second member.

9. A portable fish clamp, comprising:
a first elongated member including an elongated handle and a forward section including a front edge having a first, second and third rows of orthogonally projecting teeth said first row being located proximate to the front edge and said second and third rows diverge oppositely relative to said front row and the elongated bisector of the elongated member,
a second member having a depressible thumb grip and a forward section having orthogonally projecting teeth where the forward section of said second member overlies that of said first member, and
means for pivotally mounting said first and second members and tensioning said members
where the border of each tooth forms a triangle, the sides of which are on inwardly curved radius arc and the base of which is the respective members,
when said first and second forward sections are tensioned together, the points of each tooth project into the space between corresponding teeth on the opposite section.

10. A clamp according to claim 9 where the compression means is a spring and further including pin means for pivotally mounting said first and second members, said pin means being located rearwardly of said second and third rows of teeth where said spring is mounted to said pin means.

11. A portable fish scaling and cleaning clamp comprising,
a first elongated unitary member, said member including an elongated handle and a planar portion where said planar portion has peripheral side walls, a toothed front edge and teeth disposed in a V-shaped pattern diverging from and behind said front edge, all of said teeth projecting upwardly from said planar portion,
a second member, having a planar section and a thumb grip portion rising rearwardly from said planar section, said planar section being adapted to lie above and corresponding in size to said planar portion of said first elongaed member and the front edge of said planar section having downwardly projecting teeth designed to interfit with said toothed front edge of said first elongated member and teeth similarly patterned projecting downwardly behind the front edge of the planar section where said teeth intermesh with the teeth of said first portion.

12. A clamp according to claim 11 further comprising a filleting board and means for securing said clamp to said filleting board.

13. A clamp according to claim 12 where said filleting board is provided with bolt holes and said means are hook clips adapted to be removable bolted to said board through said holes and clamp over said peripheral sidewalls.

* * * * *